United States Patent
Gall et al.

[11] 3,882,139
[45] May 6, 1975

[54] 2-[3-(HYDROXYMETHYL)-5-(PHTHALIMIDOMETHYL)-4H,1,2,4-TRIAZOL-4-YL]BENZOPHENONES

[75] Inventors: Martin Gall, Kalamazoo; Jackson B. Hester, Jr., Galesburg, both of Mich.

[73] Assignee: The Upjohn Company, Kalamazoo, Mich.

[22] Filed: June 19, 1974

[21] Appl. No.: 480,978

Related U.S. Application Data

[63] Continuation-in-part of Ser. No. 332,293, Feb. 14, 1973, Pat. No. 3,842,090.

[52] U.S. Cl............................................ 260/308 R
[51] Int. Cl............................................ C07d 57/00
[58] Field of Search............................. 260/308 R

[56] References Cited
UNITED STATES PATENTS

| | | | |
|---|---|---|---|
| 3,709,899 | 1/1973 | Hester............................ | 260/308 R |
| 3,813,412 | 5/1974 | Gall et al........................ | 260/308 R |

*Primary Examiner*—Alton D. Rollins
*Attorney, Agent, or Firm*—Hans L. Berneis

[57] ABSTRACT

Compounds of the formula

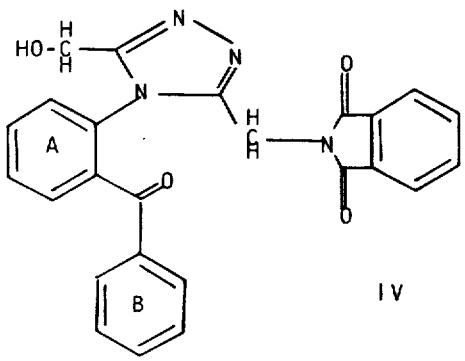

IV wherein rings A and B are unsubstituted or substituted with one or two substituents selected from the group consisting of fluoro, chloro, bromo, trifluoromethyl and nitro, are produced by treating a compound of formula I:

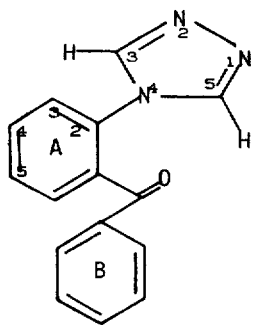

I in which rings A and B have the meaning of above, with formaldehyde to obtain compound II (the 3-hydroxymethyl derivative of compound I): treating compound II with phthalimide, triphenylphosphine, and diethyl azodicarboxylate to obtain compound III (the 3-phthalimidomethyl derivative of compound I) and treating compound III with formaldehyde to obtain compound IV above.

Compound IV is an intermediate in the production of very active 1-[(amino- or substituted amino)methyl]-6-phenyl-4H-s-triazolo[4,3-a][1,4]benzodiazepines useful as tranquilizers, anti-anxiety compounds and antidepressants.

10 Claims, No Drawings

2-[3-(HYDROXYMETHYL)-5-(PHTHALIMIDOMETHYL)-4H,1,2,4-TRIAZOL-4-YL]BENZOPHENONES

CROSS REFERENCE TO RELATED APPLICATION

This application is a continuation in part of application Ser. No. 332,293, filed Feb. 14, 1973, now U.S. Pat. No. 3,842,090.

BACKGROUND OF THE INVENTION

FIELD OF THE INVENTION

This invention is directed to organic compounds and is particularly concerned with a [3-hydroxymethyl-5-(phthalimidomethyl)-4H-1,2,4-triazol-4-yl]benzophenone.

The new compounds and the process of production therefor can be illustratively represented as follows:

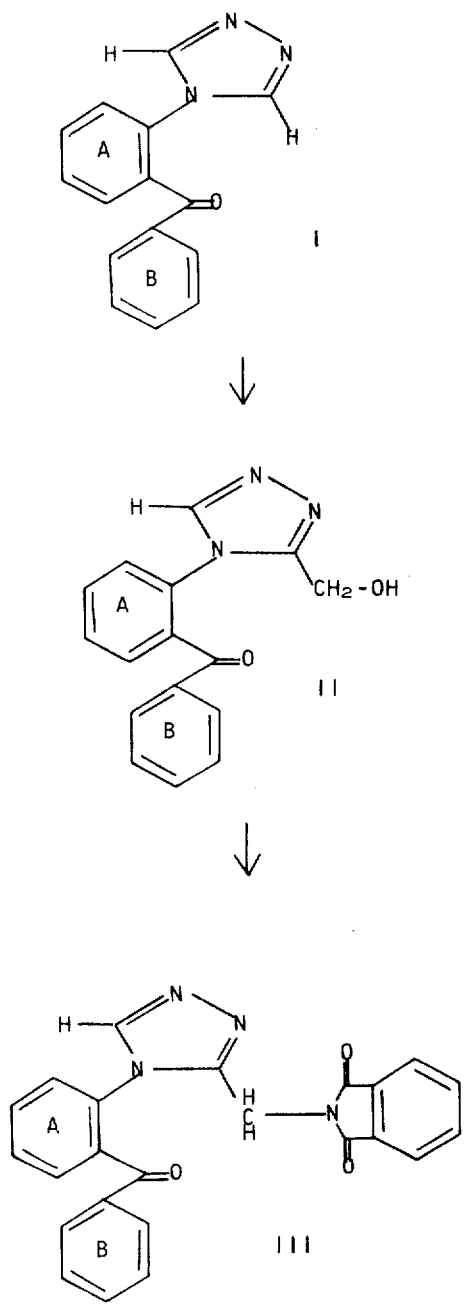

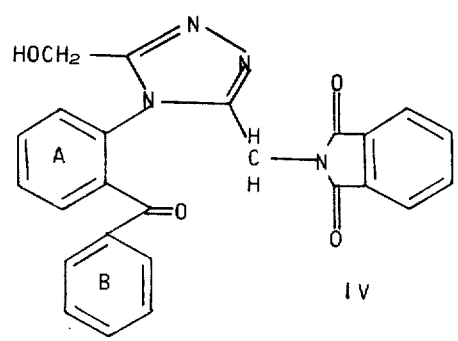

wherein the rings A and B are unsubstituted, or substituted by one or two substituents selected from the group consisting of fluoro, chloro, bromo, nitro, and trifluoromethyl.

DESCRIPTION OF THE PREFERRED EMBODIMENT

The more preferred species of intermediates of type IV compounds have the specific formula IVA:

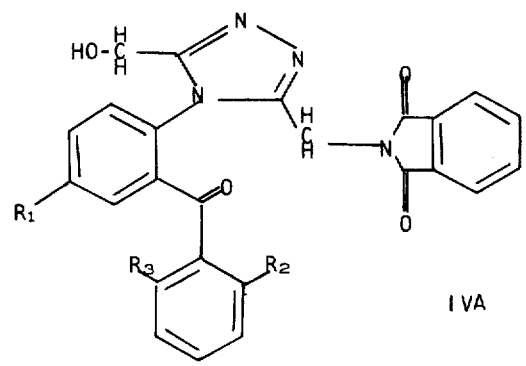

wherein $R_1$ is hydrogen, fluoro, chloro, bromo, nitro, or trifluoromethyl; wherein $R_2$ is hydrogen, chloro or fluoro; and wherein $R_3$ is hydrogen, or fluoro providing $R_2$ is fluoro.

The most desired species of intermediates of type IV have the specific formula IVB:

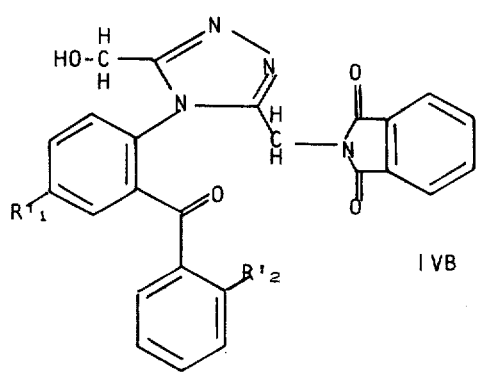

wherein $R_1$ and $R_2$ are hydrogen or chloro.

Compound IV is used as an intermediate to produce 1-[(amino- or substituted amino)methyl]-6-phenyl-4H-s-triazolo[4,3-a][1,4]benzodiazepines, by steps which can be illustrated by the following scheme:

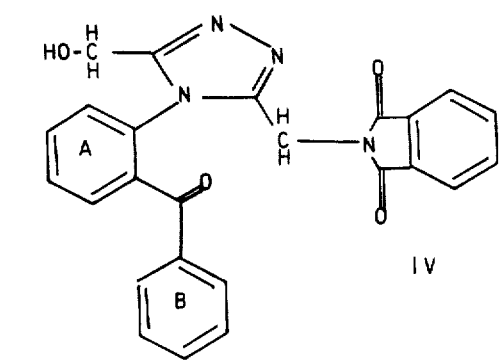

IV

SOCl₂ or PBr₃

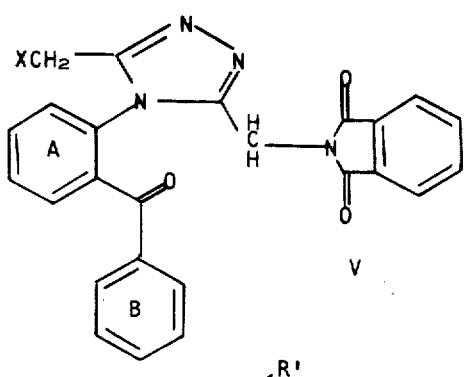

V

HN⟨R'/R''⟩

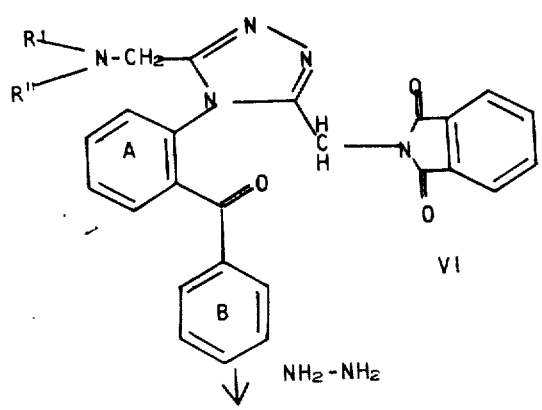

VI

NH₂-NH₂

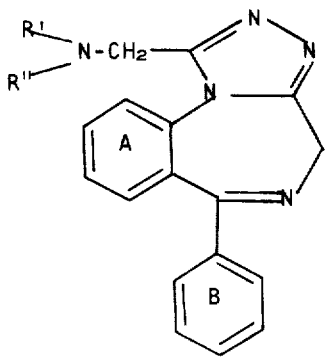

VII wherein rings A and B are defined as above, X is chlorine or bromine; and R', R'' are hydrogen alkyl of 1 to 3 carbon atoms, inclusive, or

together is pyrrolidino, piperidino, N-methylpiperazino or morpholino.

The detailed use of compounds of formula VII as well as details of their production are described in the parent application Ser. No. 332,293, filed Feb. 14, 1973, now U.S. Pat. No. 3,842,090.

The starting compounds of this invention can be produced according to the process described by M. E. Derieg et al., J. Heterocyclic Chemistry 8, 181 (1971) or according to the processes shown in U.S. Pat. 3,709,898, issued Jan. 9, 1973.

Starting compounds, thus obtained, include 5-chloro-2-(4H-1,2,4-triazol-4-yl)benzophenone; 2',5-dichloro-2-[4H-1,2,4-triazol-4-yl]benzophenone; 2'-chloro-2-(4H-1,2,4-triazol-4-yl)benzophenone; 2'-chloro-5-nitro-2-(4H-1,2,4-triazol-4-yl)benzophenone; 5-nitro-2-(4H-1,2,4-triazol-4-yl)benzophenone; 2',6'-difluoro-5-chloro-2-(4H-1,2,4-triazol-4-yl)benzophenone; 3'-chloro-6-nitro-2-(4H-1,2,4-triazol-4-yl)benzophenone; 5-fluoro-2-(4H-1,2,4-triazol-4-yl)benzophenone; 5-bromo-3'-fluoro-2-(4H-1,2,4-triazol-4-yl)benzophenone; 2'-chloro-5-fluoro-2-(4H-1,2,4-triazol-4-yl)benzophenone; 5-fluoro-2-(4H-1,2,4-triazol-4-yl)benzophenone; 2',4-dichloro-2-(4H-1,2,4-triazol-4-yl)benzophenone; 2'-chloro-5-trifluoromethyl-2-(4H-1,2,4-triazol-4-yl)-benzophenone; 5-trifluoromethyl-2-(4H-1,2,4-triazol-4-yl)benzophenone; 6-chloro-2-(4H-1,2,4-triazol-4-yl)benzophenone; 3-chloro-2-(4H-1,2,4-triazol-4-yl)benzophenone; 3'-bromo-3-nitro-2-(4H-1,2,4-triazol-4-yl)benzophenone; 3'-fluoro-6-trifluoromethyl-2-(4H-1,2,4-triazol-4-yl)-benzophenone; 4'-chloro-3-nitro-2-(4H-1,2,4-triazol-4-yl)benzophenone; 5-bromo-2'-chloro-2-(4H-1,2,4-triazol-4-yl)benzophenone; 6-bromo-2'-fluoro-2-(4H-1,2,4-triazol-4-yl)benzophenone; 2-(4H-1,2,4-triazol-4-yl)benzophenone; and the like.

In carrying out the process of this invention a selected 2-triazolobenzophenone, compound I is treated with formaldehyde at between 100°–150° C. for 3–18 hours. The formaldehyde used can either be in an aqueous solution, requiring then a sealed vessel, or can be paraformaldehyde in a high-boiling solvent e.g. toluene, xylenes, ethylbenzene, and the like. The product II, a 2-[3-(hydroxymethyl)-4H-1,2,4-triazol-4- yl]benzophenone is recovered and purified by conventional means, such as chromatography and crystallization.

Compound II in an inert organic solvent e.g. tetrahydrofuran is then treated with phthalimide, triphenylphosphine and diethyl azodicarboxylate for 2–36 hours at a temperature of 0° to 40° C. The resulting product III is obtained by concentrating the reaction solution, extraction, chromatography, and the like.

Compound III is then treated with formaldehyde or paraformaldehyde as described in the reaction with compound I, to give the corresponding 2-[5-(hydroxymethyl)-3-(phthalimidomethyl)-4H-1,2,4-triazol-4-yl]benzophenone, IV.

The following examples are illustrative of the process and products of the present invention, but are not to be construed as limiting.

EXAMPLE 1

5-Chloro-2-[3-(hydroxymethyl)-4H-1,2,4-triazol-4-yl]benzophenone

A stirred mixture of 0.01 mole of 5-chloro-2-(4H-1,2,4-triazol-4-yl)benzophenone [M. E. Derieg, R. I. Fryer and S. S. Hillery, J. Heterocyclic Chem. 8, 181 (1971)], paraformaldehyde (0.33 g.) and xylene (100 ml.) is warmed under nitrogen, in a bath maintained at 125° C. for 7 hours. The mixture is then concentrated in vacuo. The residue is chromatographed on silica gel (150 g.) with 3% methanol-97% chloroform. The product, thus obtained, is crystallized from ethanol-ethyl acetate to give 5-chloro-2-[3-(hydroxymethyl)-4H-1,2,4-triazol-4-yl]benzophenone.

EXAMPLE 2

5-Chloro-2-[3-(phthalimidomethyl)-4H-1,2,4-triazol-4-yl]benzophenone

A stirred mixture of 5-chloro-2-[3-(hydroxymethyl)-4H-1,2,4-triazol-4-yl]benzophenone (0.002 mole), phthalimide (0.324 g., 0.0022 mole), triphenylphosphine (0.578 g., 0.0022 mole) and dry tetrahydrofuran (20 ml.), under nitrogen, is treated with diethyl azodicarboxylate (0.383 g., 0.0022 mole) and stirred at ambient temperature for 23 hours. It is concentrated in vacuo and the residue is chromatographed on silica gel (75 g.) with 1.5% methanol 98.5% chloroform; 10 ml. fractions are collected. The product is crystallized from methylene chloride-methanol to give 5-chloro-2-[3-(phthalimidomethyl)-4H-1,2,4-triazol-4-yl]benzophenone of melting point 229.5°–230.5° C.

Alternatively, 5-chloro-2-[3-(phthalimidomethyl)-4H-1,2,4-triazol-4-yl]benzophenone can be prepared by the method of Example 3.

EXAMPLE 3

5-Chloro-2-[3-(phthalimidomethyl)-4H-1,2,4-triazol-4-yl]benzophenone

A solution of 1.00 mmol. of 5-chloro-2-[3-(hydroxymethyl)-4H-1,2,4-triazol-4-yl]benzophenone in 5.0 ml. of methylene chloride is cooled to 0° C. in an ice bath. Triethylamine (0.150 g., 1.5 mmol.) is added and the solution is stirred for 5 minutes at 0° C. Cautiously, and dropwise over 4 minutes, 0.106 ml. (1.3mmol.) of methanesulfonyl chloride is added and the solution is stirred for 20 minutes. The reaction is quenched on ice and extracted with a saturated aqueous sodium bicarbonate solution, dried over anhydrous sodium sulfate and concentrated in vacuo. The resulting oil, dissolved in 4.0 ml. of freshly distilled tetrahydrofuran is treated at 0° C. with 0.332 g. (2.0 mmol.) of potassium iodide, followed by 0.37 g. (2.0 mmol.) of potassium phthalimide. The mixture is stirred at 0° C. for 10 minutes then warmed to room temperature and stirred overnight. The mixture is quenched in aqueous 5% sodium hydroxide solution and the product is extracted with chloroform. The chloroform layer is dried over anhydrous sodium sulfate and concentrated in vacuo to yield 5-chloro-2-[3-(phthalimidomethyl)-4H-1,2,4-triazol-4-yl]benzophenone of melting point 229.5°–230.5°C.

EXAMPLE 4

5-Chloro-2-[5-(hydroxymethyl)-3-(phthalimidomethyl)-4H-1,2,4-triazol-4-yl]benzophenone A stirred suspension of 4.43 g. (0.01 mole) of 5-chloro-2-[3-(phthalimidomethyl)-4H-1,2,4-triazol-4-yl]-benzophenone and 3.0 g. of paraformaldehyde in 100 ml of xylene is warmed under nitrogen in an oil bath at 120°–123° C. for 50 minutes. Additional paraformaldehyde (1 g.) is added and heating is continued for an additional 45 minutes. The mixture is concentrated and the residue is dissolved in methylene chloride and filtered to remove residual paraformaldehyde. The filtrate is concentrated and the residue chromatographed on 200 g. of silica gel with mixtures of chloroform and methanol containing from 1.5% to 5% methanol. The product, thus obtained, is crystallized from methylene chloride-methanol to give 4.25 g. of 5-chloro-2-[5-(hydroxymethyl)-3-(phthalimidomethyl)-4H-1,2,4-triazol-4-yl]benzophenone of melting point 229.5°–231° C. The analytical sample has a melting point of 229.5°–230.5° C.

Anal. calcd. for $C_{25}H_{17}ClN_4O_4$: C, 63.50; H, 3.62; Cl, 7.50; N, 11.85.

Found: C, 63.30; H, 3.90; Cl, 7.43; N, 11.92.

EXAMPLE 5

2',5-Dichloro-2-[3-(hydroxymethyl)-4H-1,2,4-triazol-4-yl]benzophenone

In the manner given in Example 1, 2',5-dichloro-2-[4H-1,2,4-triazol-4-yl]benzophenone is reacted with paraformaldehyde to give 2',5-dichloro-2-[3-(hydroxymethyl)-4H-1,2,4-triazol-4-yl]benzophenone.

EXAMPLE 6

2',5-dichloro-2-[3-(phthalimidomethyl)-4H-1,2,4-triazol-4-yl]benzophenone

In the manner given in Example 2, a mixture of 2',5-dichloro-2-[3-(hydroxymethyl)-4H-1,2,4-triazol-4-yl]-benzophenone, phthalimide and triphenylphosphine in tetrahydrofuran is reacted with diethyl azodicarboxylate to give 2',5-dichloro-2-[3-(phthalimidomethyl)-4H-1,2,4-triazol-4-yl]benzophenone.

EXAMPLE 7

2',5-Dichloro-2-[5-(hydroxymethyl)-3-(phthalimidomethyl)-4H-1,2,4-triazol-4-yl]benzophenone In the manner given in Example 4, 2',5-dichloro-2-[3-(phthalimidomethyl)-4H-1,2,4-triazol-4-yl]benzophenone and paraformaldehyde are heated in xylene to give 2',5-dichloro-2-[5-(hydroxymethyl)-3-(phthalimidomethyl)-4H-1,2,4-triazol-4-yl]benzophenone.

EXAMPLE 8

5-chloro-2',6'-difluoro-2-[3-(hydroxymethyl)-4H-1,2,4-triazol-4-yl]benzophenone

In the manner given in Example 1, 5-chloro-2',6'-difluoro-2-(4H-1,2,4-triazol-4-yl)benzophenone is reacted with paraformaldehyde to give 5-chloro-2',6'-difluoro-2-[3-(hydroxymethyl)-4H-1,2,4-triazol-4-yl]benzophenone.

EXAMPLE 9

5-Chloro-2',6'-difluoro-2-[3-(phthalimidomethyl)-4H-1,2,4-triazol-4-yl]benzophenone In the manner given in Example 2, a mixture of 5-chloro-2',6'-difluoro-2-[3-(hydroxymethyl)-4H-1,2,4-triazol-4-yl]benzophenone, phthalimide and triphenylphosphine in tetrahydrofuran is reacted with diethyl azodicarboxylate to give 5-chloro-2',6'-difluoro-2-[3-(phthalimidomethyl)-4H-1,2,4-triazol-4-yl]benzophenone.

EXAMPLE 10

5-Chloro-2',6'-difluoro-2-[5-(hydroxymethyl)-3-(phthalimidomethyl)-4H-1,2,4-triazol-4-yl]benzophenone In the manner given in Example 4, 5-chloro-2',6'-difluoro-2-[3-(phthalimidomethyl)-4H-1,2,4-triazol-4-yl]-benzophenone and paraformaldehyde are heated in xylene to give 5-chloro-2',6'-difluoro-2-[5-(hydroxymethyl)-3-(phthalimidomethyl)-4H-1,2,4-triazol-4-yl]benzophenone.

EXAMPLE 11

5-Nitro-2'-chloro-2-[3-(hydroxymethyl)-4H-1,2,4-triazol-4-yl]benzophenone

In the manner given in Example 1, 5-nitro-2'-chloro-2-(4H-1,2,4-triazol-4-yl)benzophenone is reacted with paraformaldehyde to give 5-nitro-2'-chloro-2-[3-(hydroxymethyl)-4H-1,2,4-triazol-4-yl]benzophenone.

EXAMPLE 12

5-Nitro-2'-chloro-2-[3-(phthalimidomethyl)-4H-1,2,4-triazol-4-yl]benzophenone

In the manner given in Example 2, a mixture of 5-nitro-2'-chloro-2-[3-(hydroxymethyl)-4H-1,2,4-triazol-4-yl]-benzophenone, phthalimide, and triphenylphosphine in tetrahydrofuran is reacted with diethyl azodicarboxylate to give 5-nitro-2'-chloro-2-[3-(phthalimidomethyl)-4H-1,2,4-triazol-4-yl]benzophenone.

EXAMPLE 13

5-Nitro-2'-chloro-2-[5-(hydroxymethyl)-3-(phthalimidomethyl)-4H-1,2,4-triazol-4-yl]benzophenone In the manner given in Example 4, 5-nitro-2'-chloro-2-[3-(phthalimidomethyl)-4H-1,2,4-triazol-4-yl]benzophenone and paraformaldehyde are heated in xylene to give 5-nitro-2'-chloro-2-[5-(hydroxymethyl)-3-(phthalimidomethyl)-4H-1,2,4-triazol-4-yl]benzophenone.

EXAMPLE 14

2'-Chloro-5-trifluoromethyl-2-[3-(hydroxymethyl)-4H-1,2,4-triazol-4-yl]benzophenone In the manner given in Example 1, 2'-chloro-5-trifluoromethyl-2-(4H-1,2,4-triazol-4-yl)benzophenone is reacted with paraformaldehyde to give 2'-chloro-5-trifluoromethyl-2-[3-(hydroxymethyl)-4H-1,2,4-triazol-4-yl]benzophenone.

EXAMPLE 15

2'-chloro-5-trifluoromethyl-2-[3-(phthalimidomethyl)-4H-1,2,4-triazol-4-yl]benzophenone In the manner given in Example 2, a mixture of 2'-chloro-5-trifluoromethyl-2-[3-(hydroxymethyl)-4H-1,2,4-triazol-4-yl]benzophenone, phthalimide, and triphenylphosphine in tetrahydrofuran, is reacted with diethyl azodicarboxylate to give 2'-chloro-5-trifluoromethyl-2-[3-(phthalimidomethyl)-4H-1,2,4-triazol-4-yl]benzophenone.

EXAMPLE 16

2'-chloro-5-trifluoromethyl-2-[5-(hydroxymethyl)-3-(phthalimidomethyl)-4H-1,2,4-triazol-4-yl]benzophenone In the manner given in Example 4, 2'-chloro-5-trifluoromethyl-2-[3-(phthalimidomethyl)-4H-1,2,4-triazol-4-yl]benzophenone and paraformaldehyde are heated in xylene to give 2'-chloro-5-trifluoromethyl-2-[5-(hydroxymethyl)-3-(phthalimidomethyl)-4H-1,2,4-triazol-4-yl]benzophenone.

In the same manner given in Example 1 other 2-(4H-1,2,4-triazol-4-yl)benzophenones (I) can be converted with formaldehyde or paraformaldehyde to the corresponding 2-[3-(hydroxymethyl)-4H-1,2,4-triazol-4-yl]benzophenones II. Representative compounds, thus obtained, include:

5-nitro-2-[3-(hydroxymethyl)-4H-1,2,4-triazol-4-yl]benzophenone;

2',6'-difluoro-5-bromo-2-[3-(hydroxymethyl)-4H-1,2,4-triazol-4-yl]benzophenone;

3'-chloro-6-nitro-2-[3-(hydroxymethyl)-4H-1,2,4-triazol-4-yl]benzophenone;

5-fluoro-2-[3-(hydroxymethyl)-4H-1,2,4-triazol-4-yl]benzophenone;

5-bromo-3'-fluoro-2-[3-(hydroxymethyl)-4H-1,2,4-triazol-4-yl]benzophenone;

5-trifluoromethyl-2-[3-hydroxymethyl)-4H-1,2,4-triazol-4-yl]benzophenone;

2',4-dichloro-2-[3-(hydroxymethyl)-4H-1,2,4,-triazol-4-yl]-benzophenone;

6-chloro-2-[3-(hydroxymethyl)-4H-1,2,4,-triazol-4-yl]-benzophenone;

3-chloro-2-[3-(hydroxymethyl)-4H-1,2,4-triazol-4-yl]-benzophenone;

3'-bromo-3-nitro-2-[3-(hydroxymethyl)-4H-1,2,4-triazol-4-yl]benzophenone;

3'-fluoro-6-trifluoromethyl-2-[3-(hydroxymethyl)-4H-1,2,4-triazol-4-yl]benzophenone;

4'-chloro-3-nitro-2-[3-(hydroxymethyl)-4H-1,2,4-triazol-4-yl]benzophenone;

5-bromo-2'-chloro-2-[3-(hydroxymethyl)-4H-1,2,4-triazol-4-yl]benzophenone;

6-bromo-2'-fluoro-2-[3-(hydroxymethyl)-4H-1,2,4-triazol-4-yl]benzophenone;

2-[3-(hydroxymethyl)-4H-1,2,4-triazol-4-yl]benzophenone;

2'-chloro-2-[3-(hydroxymethyl)-4H-1,2,4-triazol-4-yl]-benzophenone;

and the like.

In the manner given in Example 2, compounds of formula II are reacted with phthalimide, triphenylphosphine and diethyl azodicarboxylate to give corresponding 2-[3-(phthalimidomethyl)-4H-1,2,4-triazol-4-yl]benzophenones III.

Representative compounds of formula III, thus obtained, include:
5-nitro-2-[3-(phthalimidomethyl)-4H-1,2,4-triazol-4-yl]-benzophenone;
2',6'-difluoro-5-bromo-2-[3-(phthalimidomethyl)-4H-1,2,4-triazol-4-yl]benzophenone;
3'-chloro-6-nitro-2-[3-(phthalimidomethyl)-4H-1,2,4-triazol-4-yl]benzophenone;
5-fluoro-2-[3-(phthalimidomethyl)-4H-1,2,4-triazol-4-yl]-benzophenone;
5-bromo-3'-fluoro-2-[3-(phthalimidomethyl)-4H-1,2,4-triazol-4-yl]benzophenone;
5-trifluoromethyl-2-[3-(phthalimidomethyl)-4H-1,2,4-triazol-4-yl]benzophenone;
2',4-dichloro-2-[3-(phthalimidomethyl)-4H-1,2,4-triazol-4-yl]benzophenone;
6-chloro-2-[3-(phthalimidomethyl)-4H-1,2,4-triazol-4-yl]-benzophenone;
3-chloro-2-[3-(phthalimidomethyl)-4H-1,2,4-triazol-4-yl]-benzophenone;
3'-bromo-3-nitro-2-[3-(phthalimidomethyl)-4H-1,2,4-triazol-4-yl]benzophenone;
3'-fluoro-6-trifluoromethyl-2-[3-(phthalimidomethyl)-4H-1,2,4-triazol-4-yl]benzophenone;
4'-chloro-3-nitro-2-[3-(phthalimidomethyl)-4H-1,2,4-triazol-4-yl]benzophenone;
5-bromo-2'-chloro-2-[3-(phthalimidomethyl)-4H-1,2,4-triazol-4-yl]benzophenone;
6-bromo-2'-fluoro-2-[3-(phthalimidomethyl)-4H-1,2,4-triazol-4-yl]benzophenone;
2-[3-(phthalimidomethyl)-4H-1,2,4-triazol-4-yl]benzophenone;
2'-chloro-2-[3-(phthalimidomethyl)-4H-1,2,4-triazol-4-yl]-benzophenone;
and the like.

In the manner given in Example 4, compounds of formula III are reacted with paraformaldehyde to give the corresponding 2-[5-(hydroxymethyl)-3-(phthalimidomethyl)-4H-1,2,4-triazol-4-yl]benzophenones IV. Representative compounds of formula IV, thus obtained, include:
5-nitro-2-[5-(hydroxymethyl)-3-(phthalimidomethyl)-4H-1,2,4-triazol-4-yl]benzophenone;
2',6'-difluoro-5-bromo-2-[5-(hydroxymethyl)-3-(phthalimidomethyl)-4H-1,2,4-triazol-4-yl]benzophenone;
3'-chloro-6-nitro-2-[5-(hydroxymethyl)-3-(phthalimidomethyl)-4H-1,2,4-triazol-4-yl]benzophenone;
5-fluoro-2-[5-(hydroxymethyl)-3-(phthalimidomethyl)-4H-1,2,4-triazol-4-yl]benzophenone;
5-bromo-3'-fluoro-2-[5-(hydroxymethyl)-3-(phthalimidomethyl)-4H-1,2,4-triazol-4-yl]benzophenone;
5-trifluoromethyl-2-[5-(hydroxymethyl)-3-(phthalimidomethyl)-4H-1,2,4-triazol-4-yl]benzophenone;
2',4-dichloro-2-[5-(hydroxymethyl)-3-(phthalimidomethyl)-4H-1,2,4-triazol-4-yl]benzophenone;
6-chloro-2-[5-(hydroxymethyl)-3-(phthalimidomethyl)-4H-1,2,4-triazol-4-yl]benzophenone;
3-chloro-2-[5-(hydroxymethyl)-3-(phthalimidomethyl)-4H-1,2,4-triazol-4-yl]benzophenone;
3'-bromo-3-nitro-2-[5-(hydroxymethyl)-3-(phthalimidomethyl)-4H-1,2,4-triazol-4-yl]benzophenone;
3'-fluoro-6-trifluoromethyl-2-[5-(hydroxymethyl)-3-(phthalimidomethyl)-4H-1,2,4-triazol-4-yl]benzophenone;
4'-chloro-3-nitro-2-[5-(hydroxymethyl)-3-(phthalimidomethyl)-4H-1,2,4-triazol-4-yl]benzophenone;
5-bromo-2'-chloro-2-[5-(hydroxymethyl)-3-(phthalimidomethyl)-4H-1,2,4-triazol-4-yl]benzophenone;
6-bromo-2'-fluoro-2-[5-(hydroxymethyl)-3-(phthalimidomethyl)-4H-1,2,4-triazol-4-yl]benzophenone;
2-[5-(hydroxymethyl)-3-(phthalimidomethyl)-4H-1,2,4-triazol-4-yl]benzophenone;
2'-chloro-2-[5-(hydroxymethyl)-3-(phthalimidomethyl)-4H-1,2,4-triazol-4-yl]benzophenone; and the like.

We claim:
1. A compound of the formula IV:

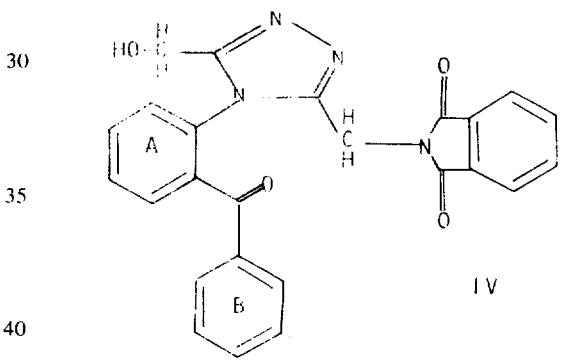

IV wherein rings A and B are unsubstituted, or substituted with one or two substituents selected from the group consisting of fluoro, chloro, bromo, trifluoromethyl and nitro.

2. A compound according to claim 1 of the formula IVA:

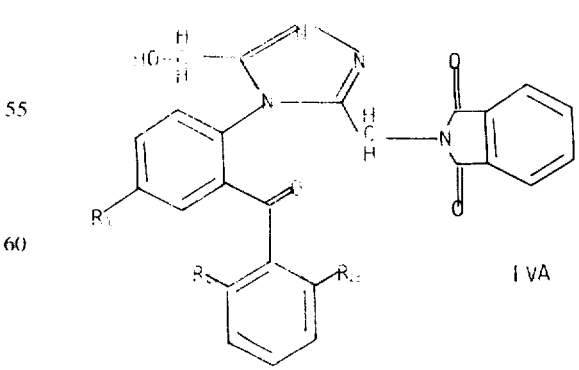

IVA wherein $R_1$ is hydrogen, fluoro, chloro, bromo, nitro, or trifluoromethyl; wherein $R_2$ is hydrogen, chloro, or fluoro; and wherein R₃ is hydrogen, or fluoro providing R₂ is fluoro.

3. A compound according to claim 2, wherein R₁ is chloro, R₂ and R₃ are fluoro and the compound is therefore 5-chloro-2',6'-difluoro-2-[5-(hydroxymethyl)-3-(phthalimidomethyl)-4H-1,2,4-triazol-4-yl]benzophenone.

4. A compound according to claim 2, wherein R₁ is nitro, R₂ is chloro, R₃ is hydrogen and the compound is therefore 2'-chloro-5-nitro-2-[5-(hydroxymethyl)-3-(phthalimidomethyl)-4H-1,2,4-triazol-4-yl]benzophenone.

5. A compound according to claim 1 of the formula IVB:

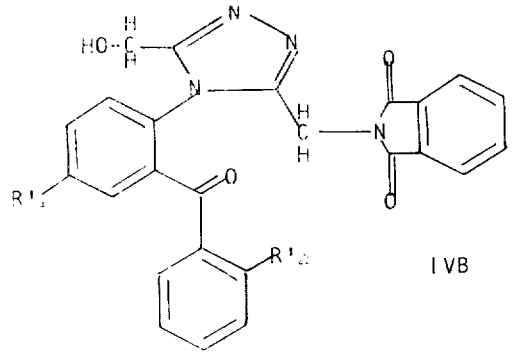

IVB wherein R'₁ and R'₂ are hydrogen or chloro.

6. A compound according to claim 5, wherein R'₁ is chloro, R'₂ is hydrogen and the compound is therefore 5-chloro-2-[5-(hydroxymethyl)-3-(phthalimidomethyl)-4H-1,2,4-triazol-4-yl]benzophenone.

7. A compound according to claim 5 wherein R'₁ and R'₂ are chloro, and the compound is therefore 2'5-dichloro-2-[5-(hydroxymethyl)-3-(phthalimidomethyl)-4H-1,2,4-triazol-4-yl]benzophenone.

8. A compound according to claim 2 wherein R₁ is trifluoromethyl, R₂ is chloro, R₃ is hydrogen, and the compound is therefore 2'-chloro-5-trifluoromethyl-2-[5-(hydroxymethyl)-3-(phthalimidomethyl)-4H-1,2,4-triazol-4-yl]benzophenone.

9. A compound according to claim 5 wherein R'₁ is hydrogen, R'₂ is chlorine and the compound is therefore 2'-chloro-2-[5-(hydroxymethyl)-3-(phthalimidomethyl)-4H-1,2,4-triazol-4-yl]benzophenone.

10. A compound according to claim 5 wherein the R'₁ and R'₂ are hydrogen and the compound is therefore 2-[5-(hydroxymethyl)-3-(phthalimidomethyl)-4H-1,2,4-triazol-4-yl]benzophenone.

* * * * *